A. FOSGATE.
AUTOMATIC DEVICE FOR RAISING SUBMERGED VESSELS AND OTHER STRUCTURES.
APPLICATION FILED JULY 7, 1917.
1,300,715.
Patented Apr. 15, 1919.
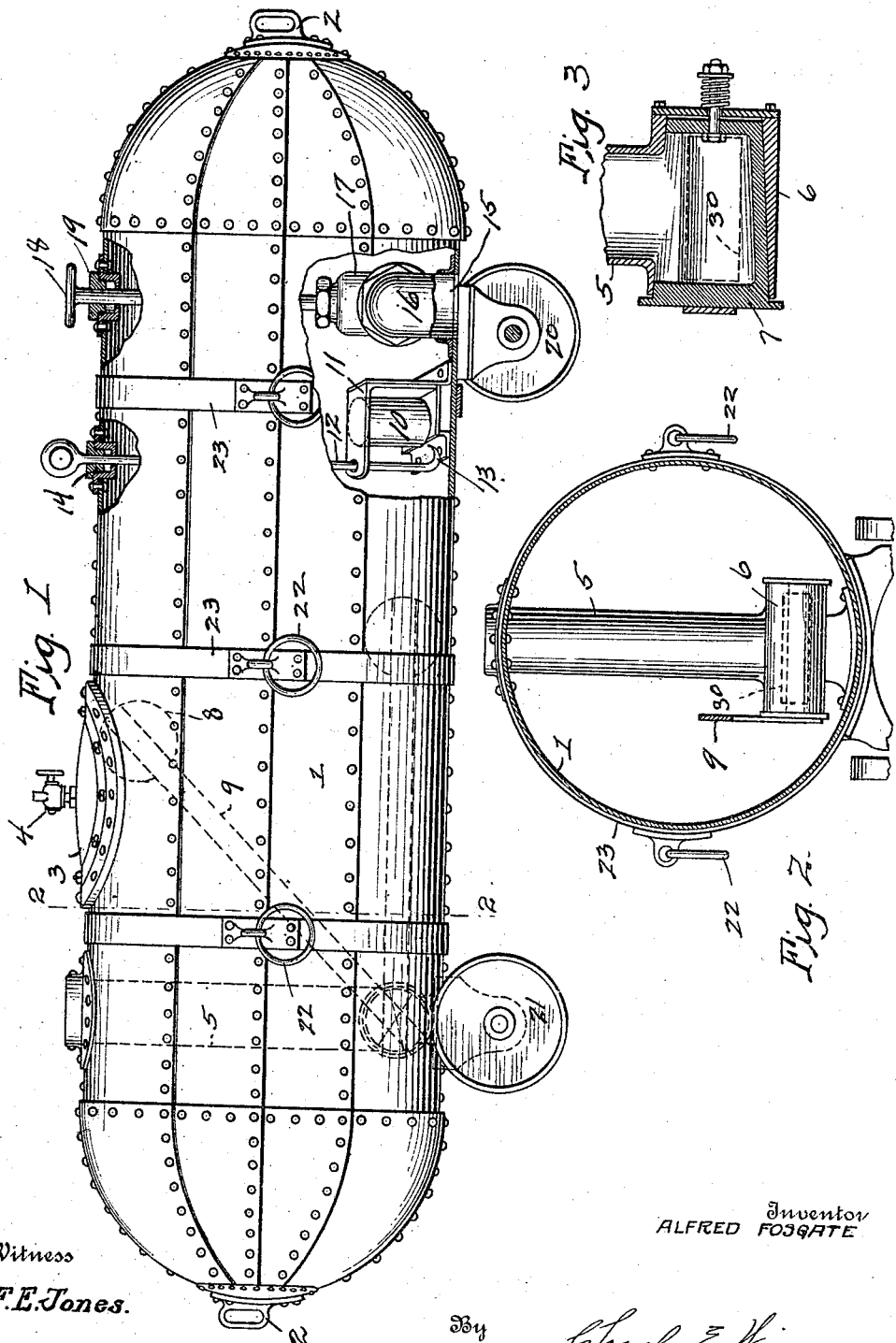
Witness
F. E. Jones.
Inventor
ALFRED FOSGATE
By Charles E. Weaver
Attorney

UNITED STATES PATENT OFFICE.

ALFRED FOSGATE, OF DETROIT, MICHIGAN.

AUTOMATIC DEVICE FOR RAISING SUBMERGED VESSELS AND OTHER STRUCTURES.

1,300,715.   Specification of Letters Patent.   Patented Apr. 15, 1919.

Application filed July 7, 1917.   Serial No. 179,176.

*To all whom it may concern:*

Be it known that I, ALFRED FOSGATE, a citizen of the United States, residing at Detroit, county of Wayne, State of Michigan, have invented a certain new and useful Improvement in Automatic Devices for Raising Submerged Vessels and other Structures, and declare the following to be a full, clear, and exact description of the same, such as will enable others skilled in the art to which it pertains to make and use the same, reference being had to the accompanying drawings, which form a part of this specification.

This invention relates to devices automatically operated to raise sunken or submerged vessels or similar structures and its principal object is a device consisting of a hollow body adapted to be filled with water whereby it may be readily submerged and attached to the sunken vessel or structure desired to be raised, and after attachment means may be released whereby the hollow body becomes automatically filled with gas and becomes buoyant and capable of raising a weight very materially greater than its own weight. An additional object of the invention is a device for the purpose consisting of a hollow metal body provided with an inlet valve controllable from the exterior to allow water to flow thereinto and also provided with a means for escape of air therefrom enabling the device to be readily submerged by filling with liquid, the device having in the interior thereof a liquid tight receptacle filled with carbid or like chemical capable of producing a gas on contact with water. The device may be opened from the exterior of the hull body the gas produced forcing the water from the hollow body, a valve being provided opening the channel to the exterior surface when the body is filled with water and closing the channel as the water is removed therefrom. Another object of the invention is a hollow body having a gas producing means therewithin as above mentioned provided with wheels or the like for ready movement of the same on the deck of a ship or other surface whereby the device may be readily handled prior to subsequent submergement and use. These and other objects and the several novel features of the invention in its preferred form are hereinafter more fully described and claimed and shown in the accompanying drawings in which—

Figure 1 is an elevation partly in section showing my improved device for raising sunken vessels.

Fig. 2 is a section thereof taken on line 2—2 of Fig. 1.

Fig. 3 is a detail of the float controlled valve.

The device may be made of various sizes corresponding to the character of the work for which it is intended, the device being made comparatively large for use with vessels and smaller sizes may be used for smaller structures. The body 1 is preferably of metal, for instance, boiler plate built up and riveted together in cylindrical form having the rounded or half ball shaped ends. At each end of the body 1 is secured a point 2 of proper size commensurate with the sizes of the apparatus in which a chain or cable may be attached. The point is formed as a slot, as shown, extending above the center line of the apparatus so that in lowering the device from shipboard or float to the surface of the water, the point of attachment of the cables or chains is above the center of gravity thus allowing the device to be lowered right side up. The body is preferably provided with a manhole 3 in the upper side thereof which may be of any approved form and air or liquid tight and is provided preferably with an aircock 4 to allow an escape of air from the hollow body when being filled with liquid. A tube 5 is provided extending into the interior of the device and opening to the exterior thereof at the top of the body, and this tube 5 is provided with a valve chamber 6 at the lower end thereof in which is positioned a valve 7 and rotation of this valve opens or closes the tube 5 to the interior of the body 1. The valve may be of any approved type but is here shown as a hollow shell open on one side and registerable with an opening 30 in the wall of the chamber and with the lower end of the tube 5 to open the tube to the body and closing the tube when turned from registration with said openings by movement of a float 8 attached to the valve by an arm 9 provided at one end of the valve member as shown in Fig. 2.

At any convenient place within the hollow body is provided a receptacle 10 preferably secured in position in a bracket 11, and the bracket is apertured at one end in which may ride a rod 12 having a hook or knife end 13 formed thereon carried adjacent the receptacle 10 for the carbid. The rod is preferably flat sided and the aperture therefor in the bracket 11 corresponding in shape thereto to prevent a rotation of the rod whereby the said hook end is held in relative position with the receptacle. This rod 10 extends through the outer wall of the body at the top at which point is provided a packing gland 14 to prevent the ingress of water about the rod 12. The body is also provided with an inlet aperture 15 in the lower side thereof either at one end or at the center as may be found convenient and to this aperture is connected an inlet pipe 16 in which is a valve 17 controlled by the valve stem 18 also extending through the upper side of the body and provided with a packing gland 19. The manhole 3 is of sufficient size to enable the various parts within the interior to be properly positioned and adjusted for use and a wheeled truck 20 and 21 is provided at each end respectively of the body to enable it to be readily moved in transportation or in preparing it for use prior to submergence or allowing it to be positioned after contact with the ocean bed.

After the device has been lowered to the surface of the water, the valve 17 may be opened allowing water to flow into the interior of the body, the aircock 4 being opened will allow an egress of air from the body and the device becomes submerged by the weight of introduced liquid. As the device becomes practically submerged the valves 4 and 17 should be closed. On filling the body, the float 8 rises to uppermost position shown by the dotted lines in Fig. 1 opening the valve 7 so that water may flow into the valve chamber 6 and pipe 5 to the exterior of the body. As the device has become submerged and positioned by a diver it may be secured to the side of the structure to be raised by means of links 22 attached to various points of the exterior of the body 1. These may be attached by means of the encircling band 23 positioned about the body as shown more particularly in Fig. 1, and after attachment of the device to the structure to be raised the rod 12 is quickly pulled upward which opens the can or receptacle 10 allowing the liquid in the body to come in contact with the carbid. This receptacle 10 carries sufficient carbid to produce a volume of gas necessary to overcome the pressure of liquid at the depth to which the device may be submerged. It is desirable that the channel 5 open through the top of the body as shown, in order that the submergence may be controlled by the valve 17 and also necessary that the tube 5 extend nearly to the bottom of the body so that practically the entire fluid content of the body may be expelled before the tube is closed by the valve. By opening of the channel through the top of the body flow of fluid into the channel from the exterior is not possible until sufficient water has been introduced through the valve 17 to produce submergence and when sufficient water has been introduced to produce submergence, the air valve should be closed preventing further introduction of fluid.

As the device becomes filled with gas the liquid is forced out through the valve 7 and pipe 5 to the exterior of the body. Inasmuch as the pressure of the gas is greater than the pressure of the liquid surrounding the body, the body may be practicallly emptied of liquid and after it becomes empty the float 8 falls to the lowermost position closing the valve and retaining the gas therewithin. The body is thus made buoyant and capable of lifting structures and weights considerably greater than itself and thus with a sufficient number of these buoyant bodies attached to a sunken vessel or structure it may be brought to the surface.

As the body is air tight no leakage of gas may occur and the sunken body raised to the surface by these buoyant devices may be towed to the desired place or port.

Having thus briefly described my invention, its utility and mode of operation, what I claim and desire to secure by Letters Patent of the United States is—

1. A device of the character described comprising a hollow air tight body having an inlet on the lower side thereof, a manually operable valve controlling the flow through the inlet, a tube extending into the body, and being open to the exterior thereof on the upper side of the body and terminating adjacent the bottom of the body, a float operated valve at the lower end of the tube, the float opening the valve as the body fills through the inlet, and a manually controlled gas producing means within the interior of the body.

2. A device of the character described comprising a hollow air tight body having a valve controlled inlet whereby the body may be filled with water by submerging the same, a discharge channel opening to the exterior of the body at the top and in communication with the interior thereof, a float operated valve for controlling the channel opening the valve as the float is raised by introduction of fluid and closing the same as the body becomes emptied, a fluid tight carbid receptacle positioned within the body, and means for rupturing the receptacle exposing the contents to action of the water to produce pressure within the receptacle and force the fluid from the body.

3. A device of the character described consisting of a hollow, wheel supported body, a valve controlled inlet whereby the body may become filled with water on lowering the same into a body thereof, a discharge conduit opening exteriorly of the body at the top, a float operated valve controlling the conduit, opening the same on introduction of fluid into the body and closing the same on removal thereof, means connected to the body above the horizontal center line whereby the same may be lowered right side up into the water, and means for attaching the body to a submerged vessel or the like.

4. A device of the character described comprising a hollow metal body having a valve controlled inlet in the bottom thereof, means for operating the valve from the exterior of the body, a tube extending into the body terminating adjacent the bottom and opening through the top thereof a float operated valve controlling the inner end of the tube, a receptacle positioned within the body for holding material adapted to produce a gas on contact of water therewith, the receptacle being fluid tight, means for rupturing the receptacle operable from the exterior of the body, the float operated valve being opened by fluid entering the body and closed as the body becomes emptied by pressure produced with the gas, and means for attaching the body to a submerged structure.

In testimony whereof, I sign this specification.

ALFRED FOSGATE.

Copies of this patent may be obtained for five cents each, by addressing the "Commissioner of Patents, Washington, D. C."